US012576337B2

(12) United States Patent　　　(10) Patent No.:　US 12,576,337 B2
Kando　　　　　　　　　　　　(45) Date of Patent:　Mar. 17, 2026

(54) COMPUTER-READABLE NON-TRANSITORY STORAGE MEDIUM HAVING INFORMATION PROCESSING PROGRAM STORED THEREIN, INFORMATION PROCESSING SYSTEM, AND INFORMATION PROCESSING METHOD

(71) Applicant: Nintendo Co., Ltd., Kyoto (JP)

(72) Inventor: Yuji Kando, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 263 days.

(21) Appl. No.: 18/478,541

(22) Filed: Sep. 29, 2023

(65) Prior Publication Data

US 2024/0115949 A1　　Apr. 11, 2024

(30) Foreign Application Priority Data

Oct. 5, 2022　(JP) ................................. 2022-160691

(51) Int. Cl.
*A63F 13/56*　　　　(2014.01)
(52) U.S. Cl.
CPC .................................... *A63F 13/56* (2014.09)
(58) Field of Classification Search
CPC ...... A63F 13/56; A63F 13/2145; A63F 13/42;
A63F 13/55
See application file for complete search history.

(56) References Cited

U.S. PATENT DOCUMENTS

2005/0221880 A1　10/2005　Kando
2007/0218992 A1*　9/2007　Maehiro ............... A63F 13/577
463/31
2014/0357359 A1　12/2014　Kando

FOREIGN PATENT DOCUMENTS

JP　　2005-287757　　10/2005
JP　　2010-287191　　12/2010
JP　　2012-061091　　3/2012
JP　　2014233536 A　12/2014
JP　　2021-142230　　9/2021

* cited by examiner

*Primary Examiner* — Peter J Iannuzzi
(74) *Attorney, Agent, or Firm* — Nixon & Vanderhye, PC

(57)　　　　　ABSTRACT

A plurality of second coordinate sets in a virtual space are calculated on the basis of a first coordinate set to which an operation target object is moved. For each of the plurality of second coordinate sets, a movement allowance degree indicating whether or not movement of a follow-up object to the second coordinate set is allowed is calculated. On the basis of the movement allowance degrees for the second coordinate sets, a movement goal reference coordinate set which is a coordinate set serving as a reference for movement destination determination in moving the follow-up object toward a movement allowed position is calculated. The follow-up object is moved to a position based on the movement goal reference coordinate set.

7 Claims, 20 Drawing Sheets

SUB CHARACTER 1

SUB CHARACTER 2

SUB CHARACTER 3

F I G. 1
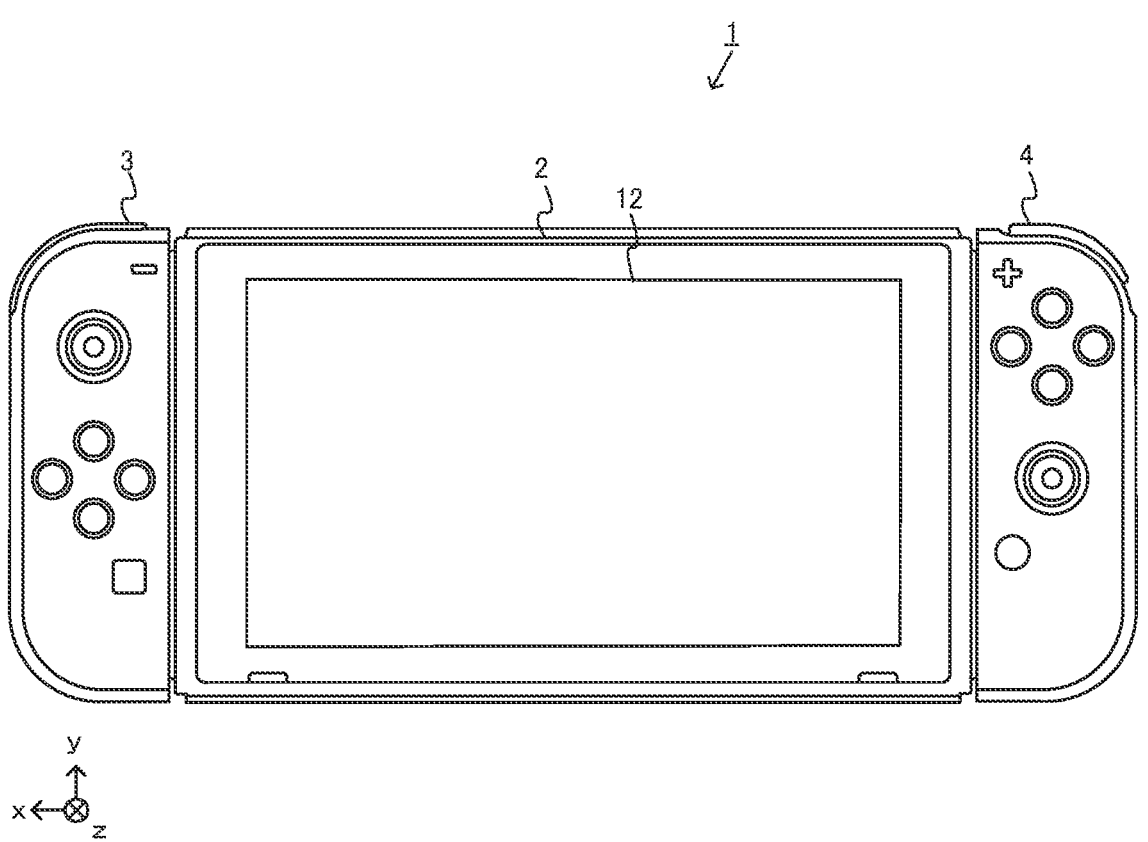

F I G.  2
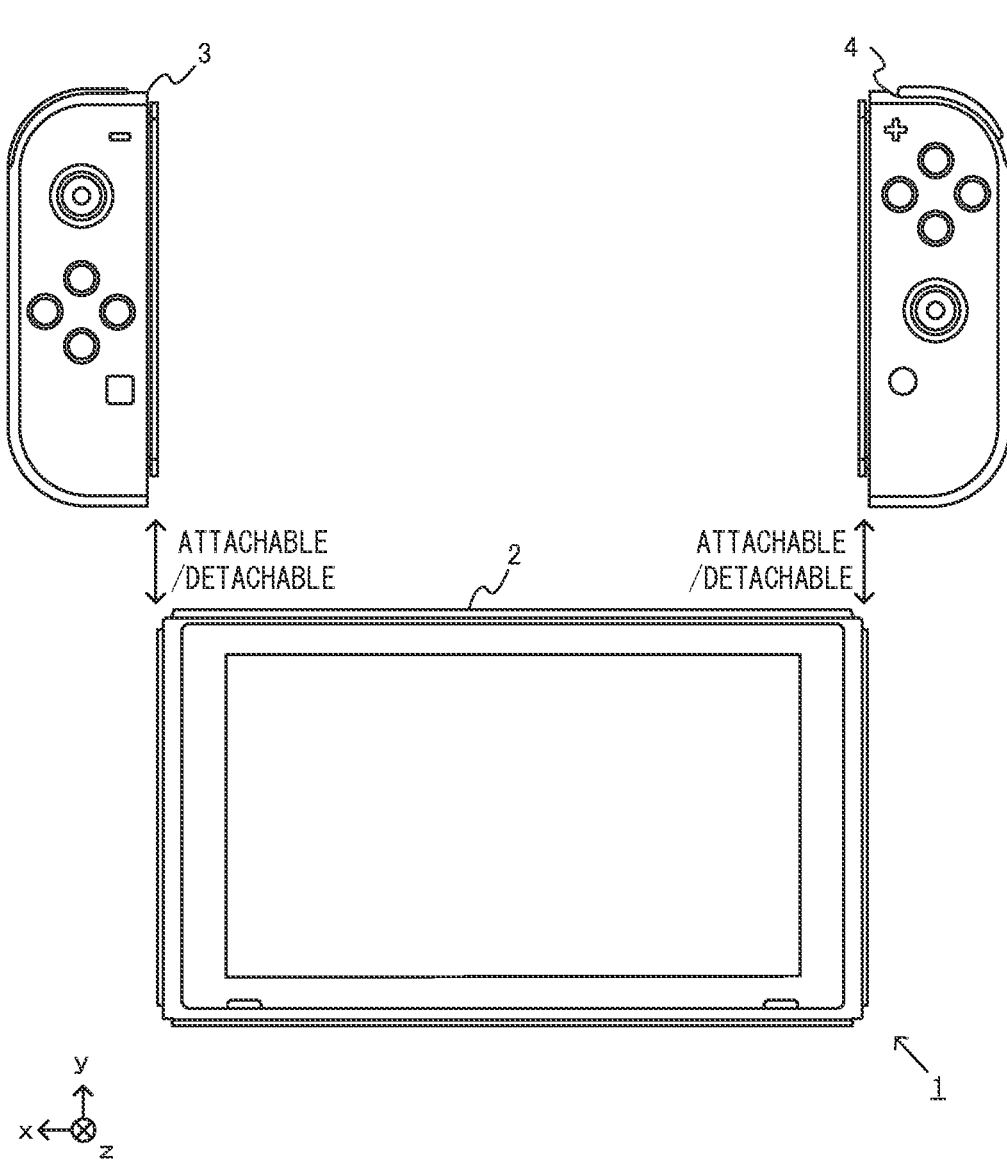

F I G. 3
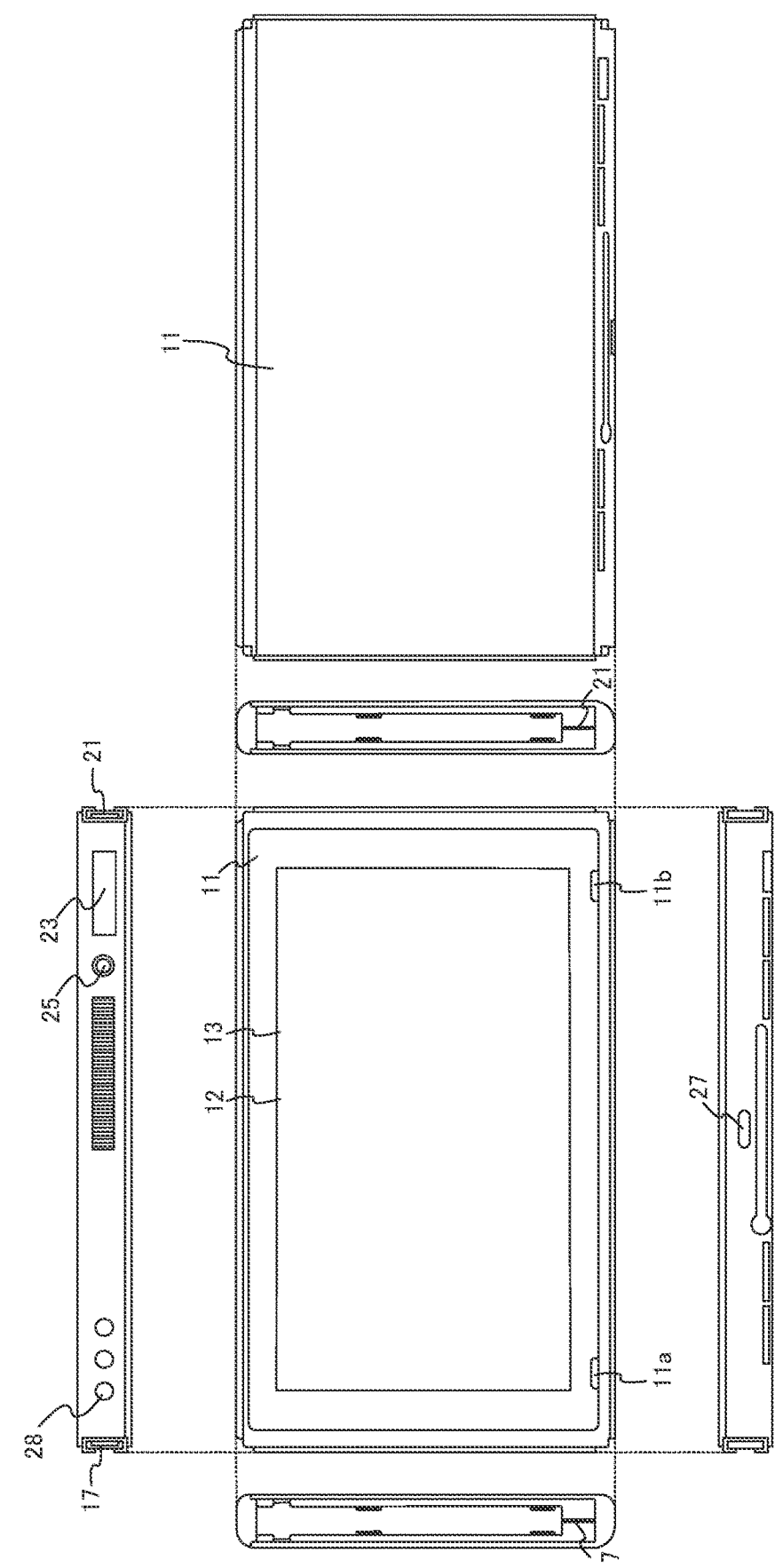

F I G. 5
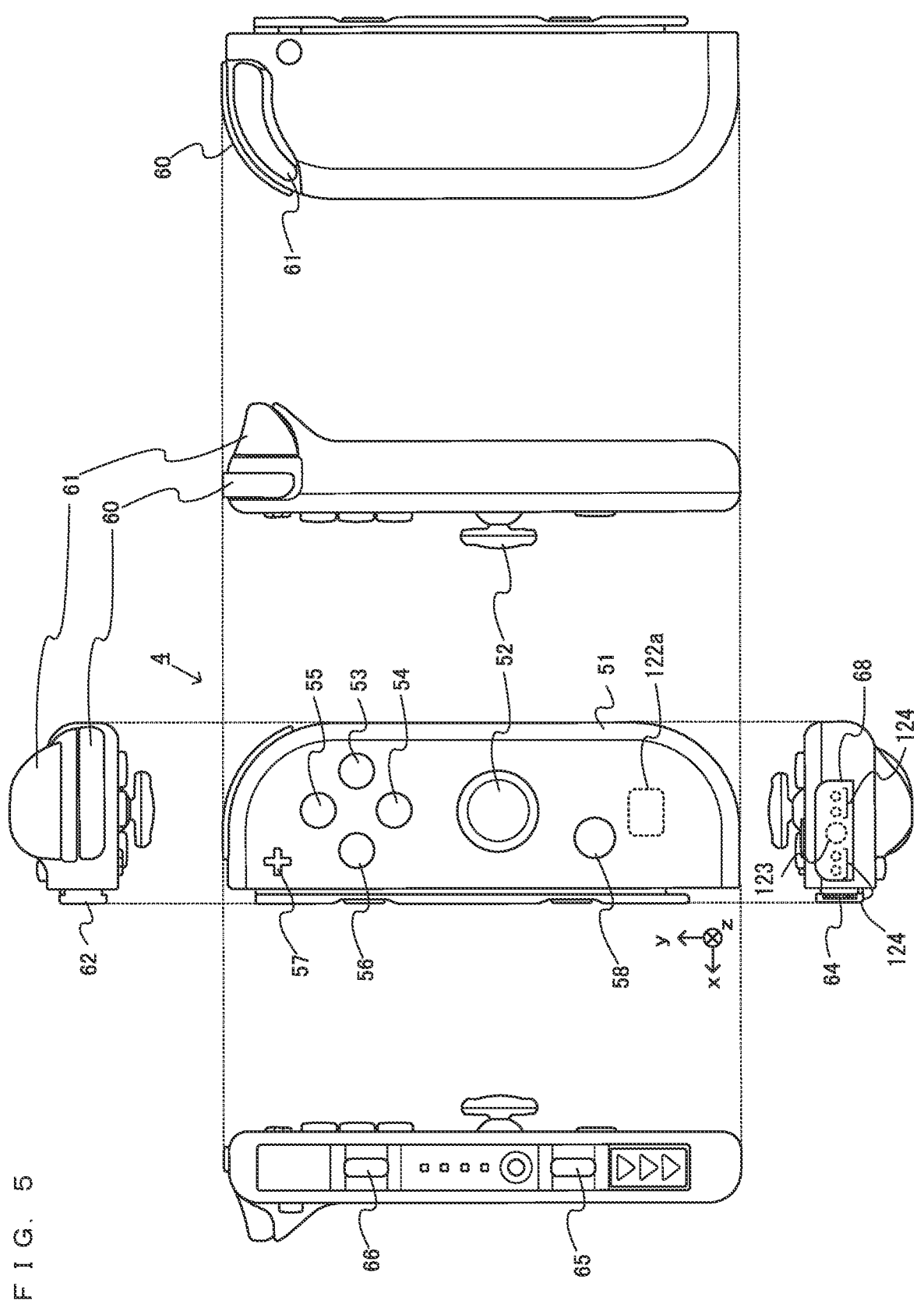

F I G. 6

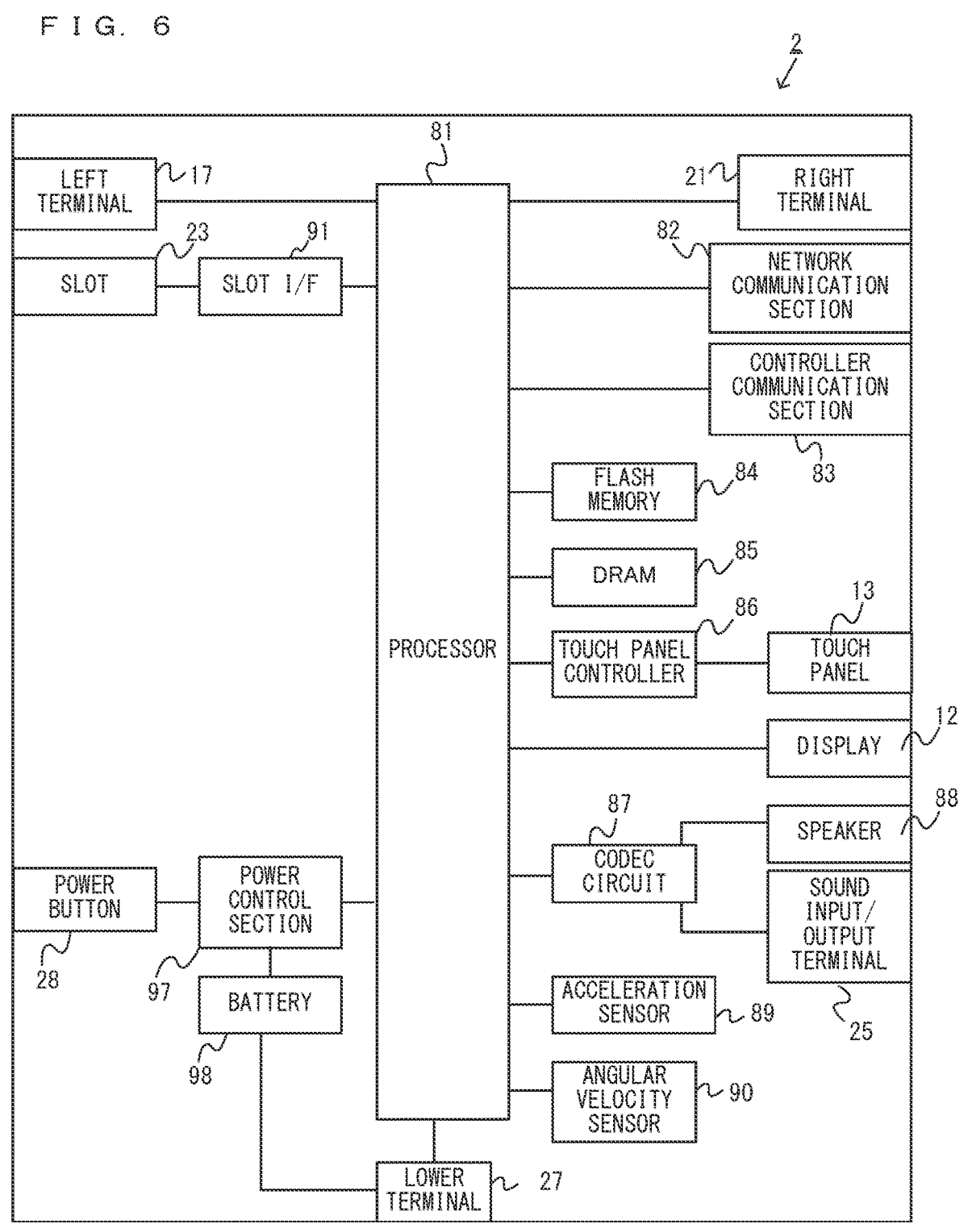

2

81

LEFT TERMINAL 17

RIGHT TERMINAL 21

SLOT 23

SLOT I/F 91

NETWORK COMMUNICATION SECTION 82

CONTROLLER COMMUNICATION SECTION 83

PROCESSOR

FLASH MEMORY 84

DRAM 85

TOUCH PANEL CONTROLLER 86

TOUCH PANEL 13

DISPLAY 12

SPEAKER 88

CODEC CIRCUIT 87

SOUND INPUT/ OUTPUT TERMINAL 25

POWER BUTTON 28

POWER CONTROL SECTION 97

BATTERY 98

ACCELERATION SENSOR 89

ANGULAR VELOCITY SENSOR 90

LOWER TERMINAL 27

F I G. 7

F I G.  8
LEADER CHARACTER
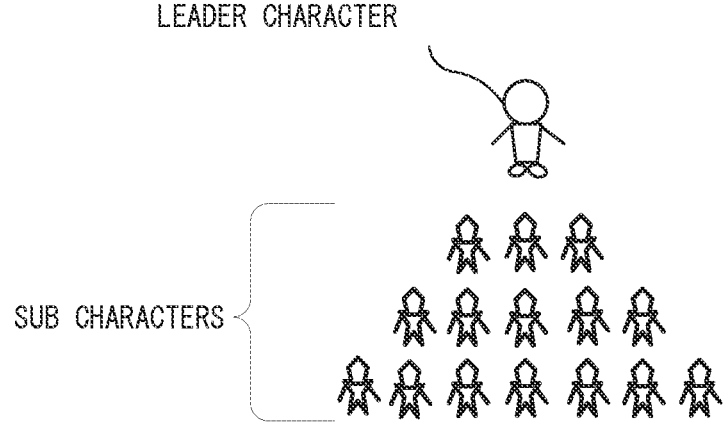
SUB CHARACTERS
F I G.  9
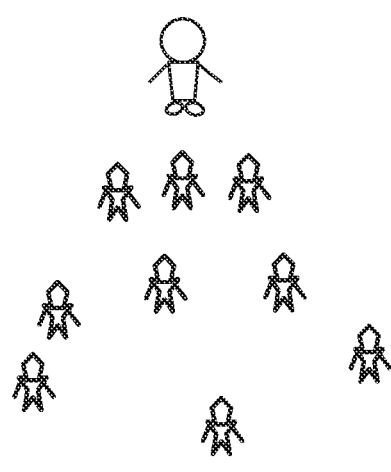

F I G. 1 0
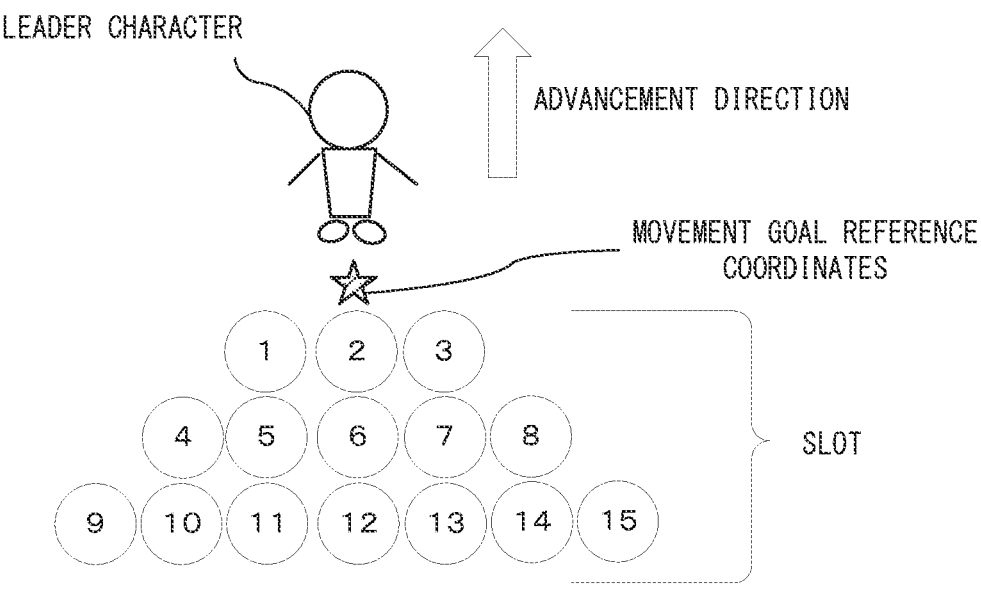
F I G. 1 1
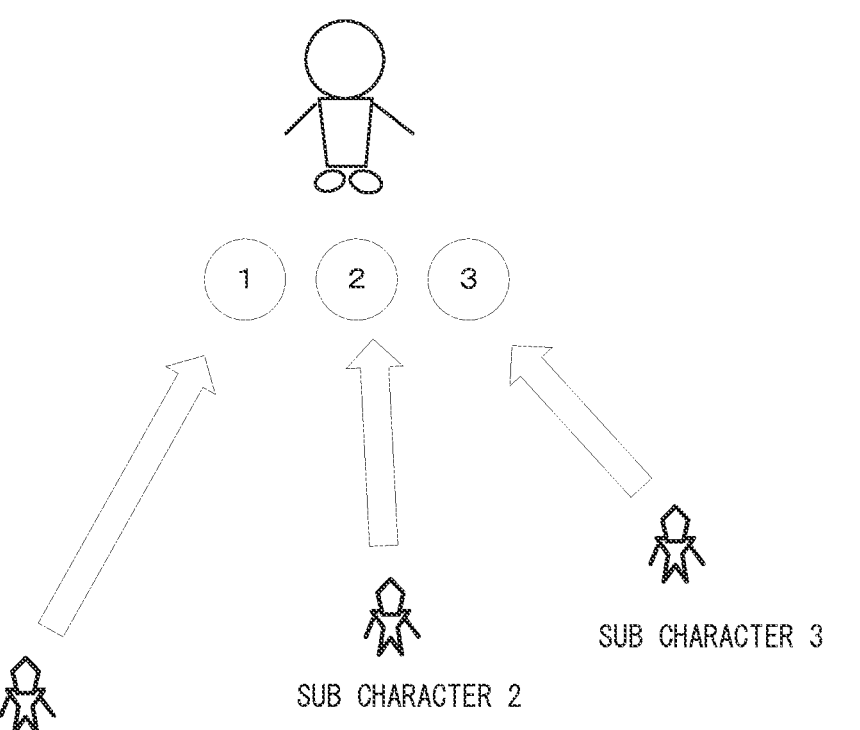

F I G.  1 2
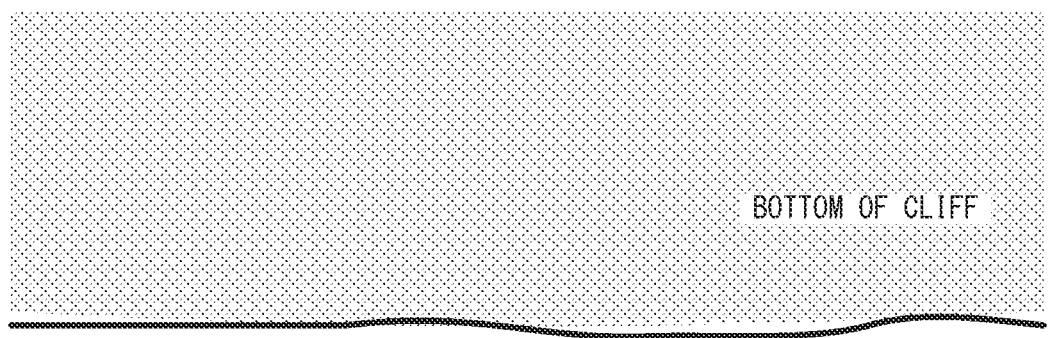
BOTTOM OF CLIFF
TOP OF CLIFF
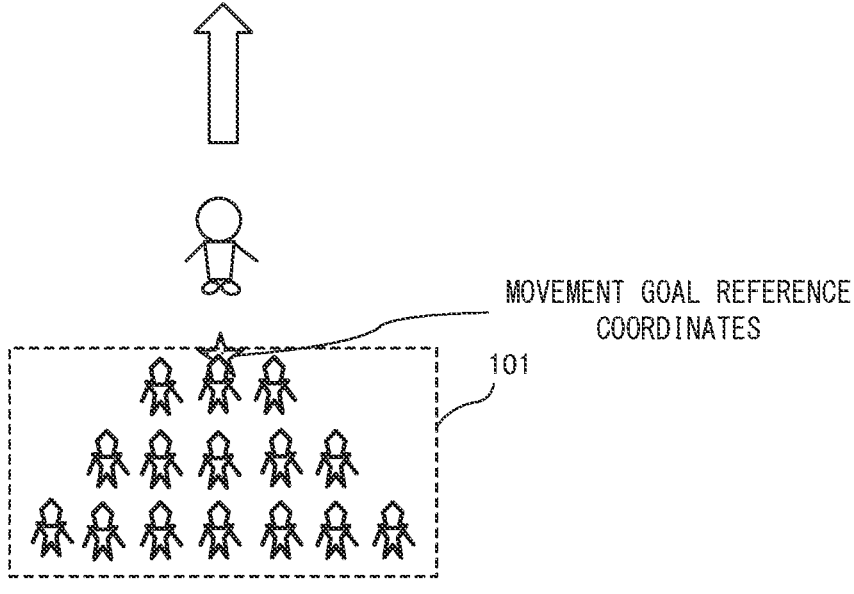
MOVEMENT GOAL REFERENCE
COORDINATES
101

F I G.  1 3
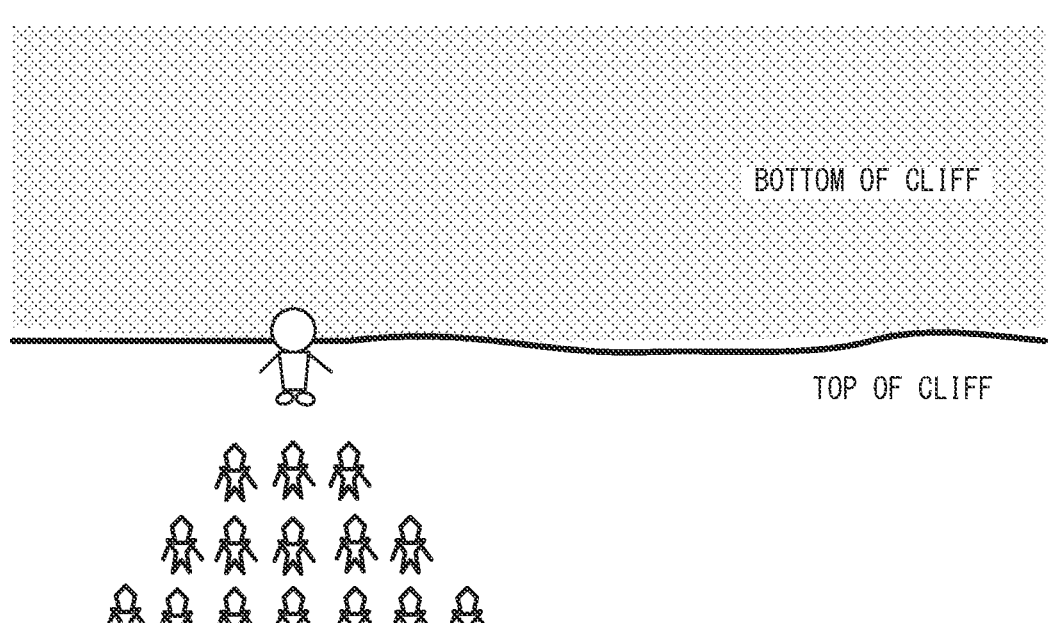
F I G.  1 4
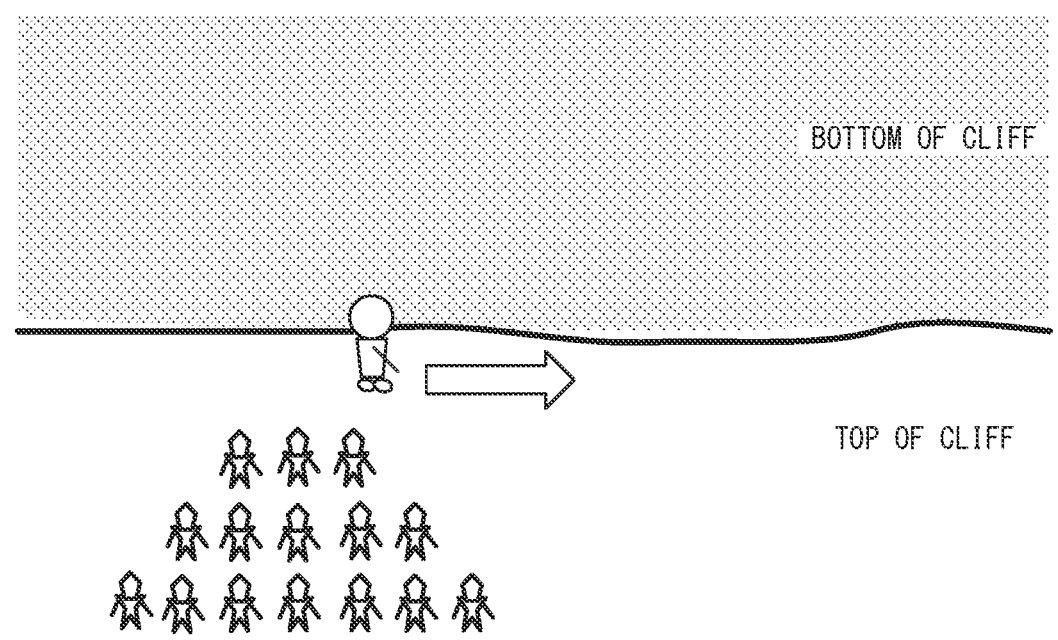

F I G.  1 5
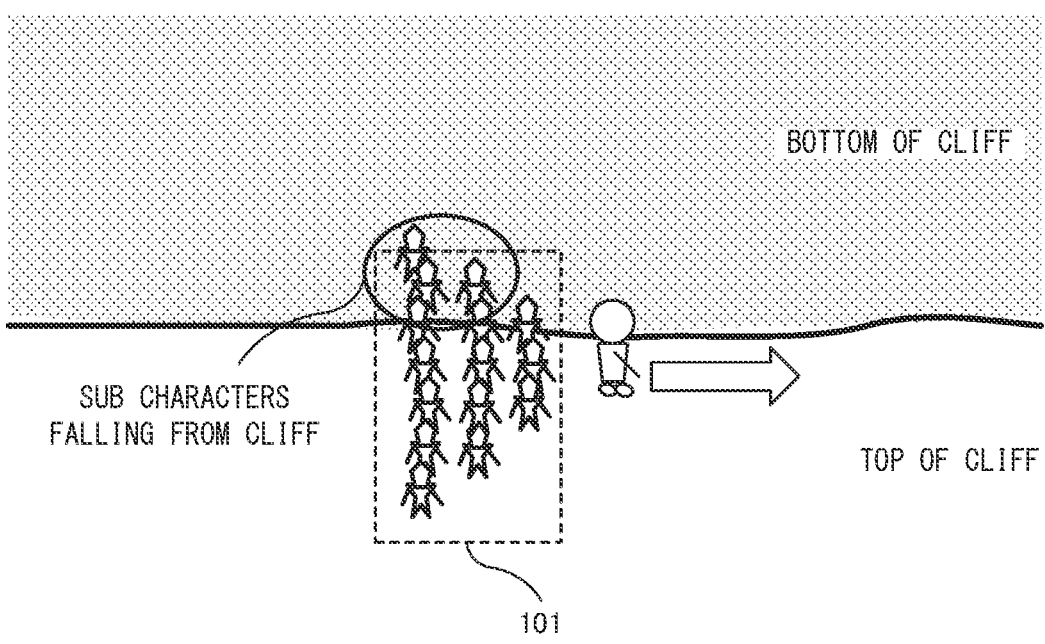

F I G. 1 6
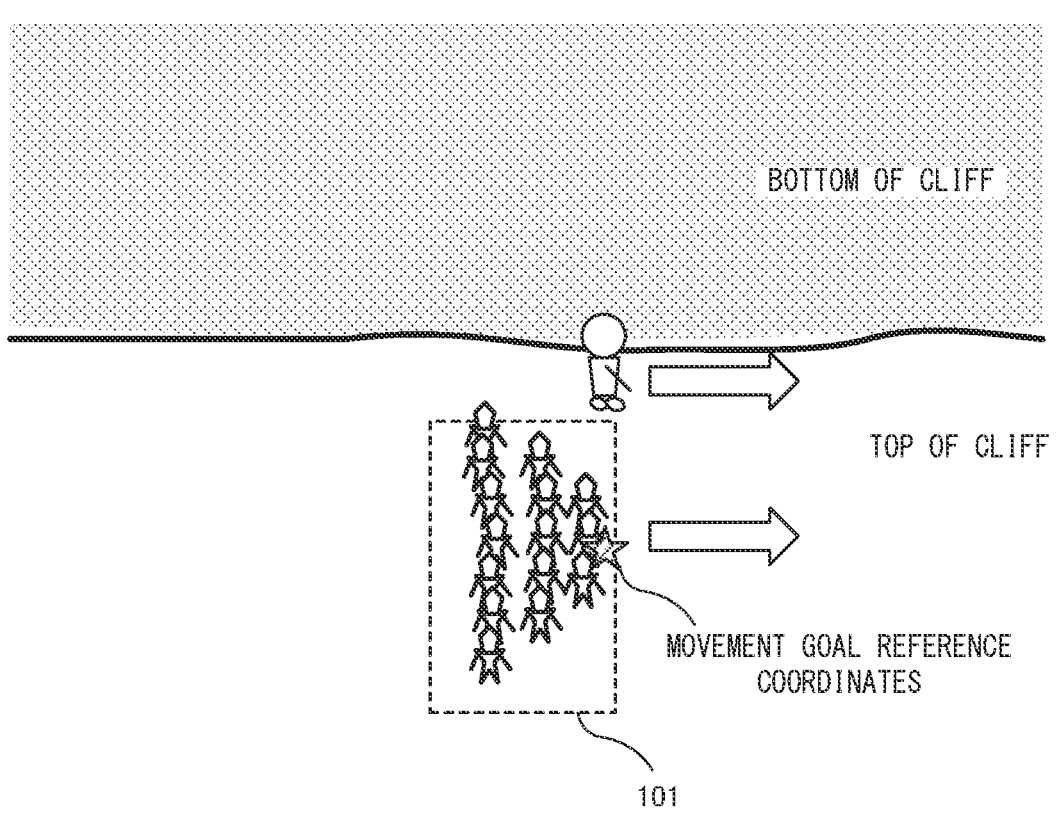

F I G.  1 7
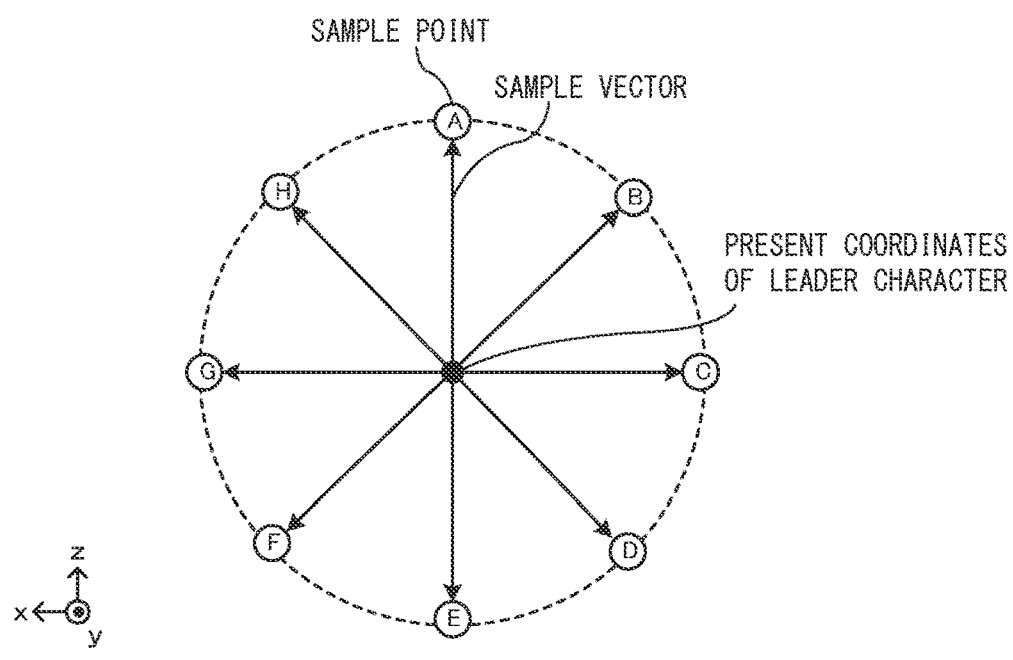
F I G.  1 8
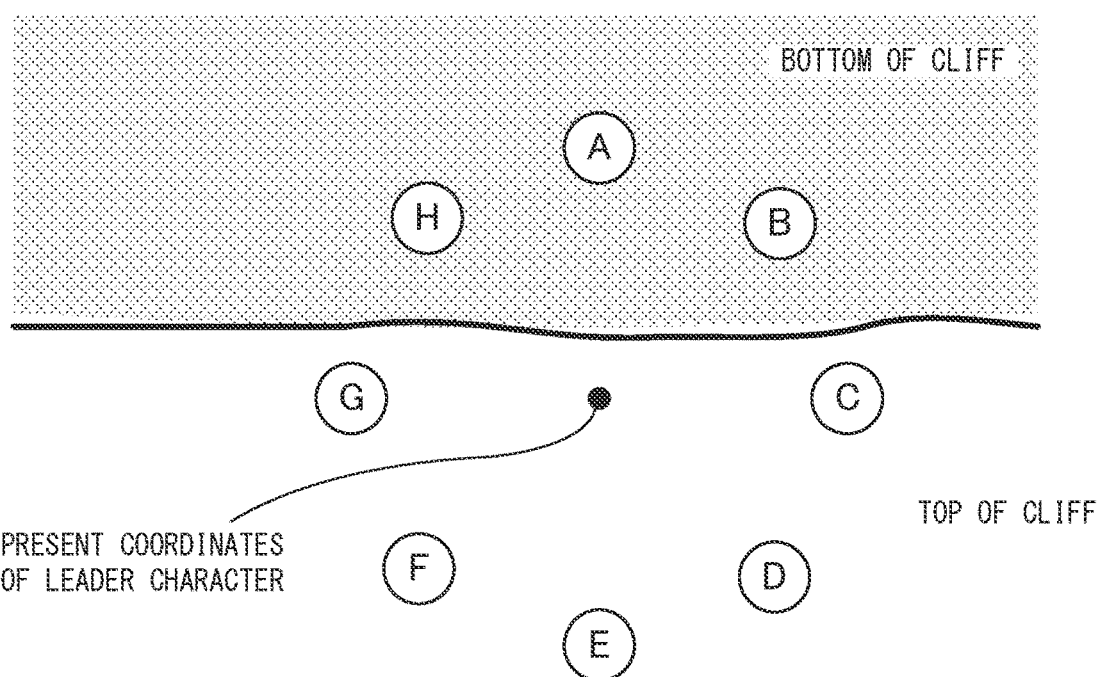

F I G. 1 9
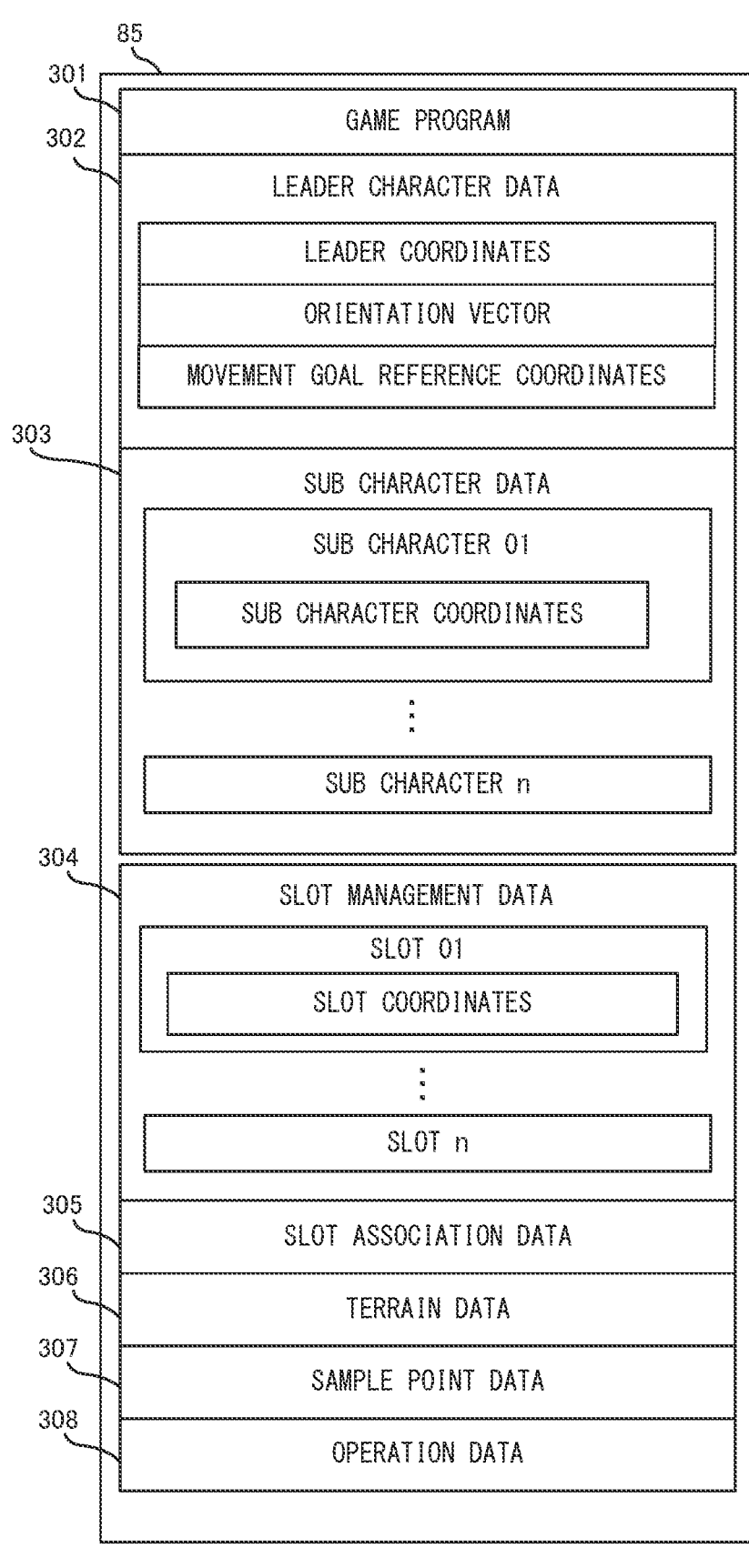

F I G.  2 0
307
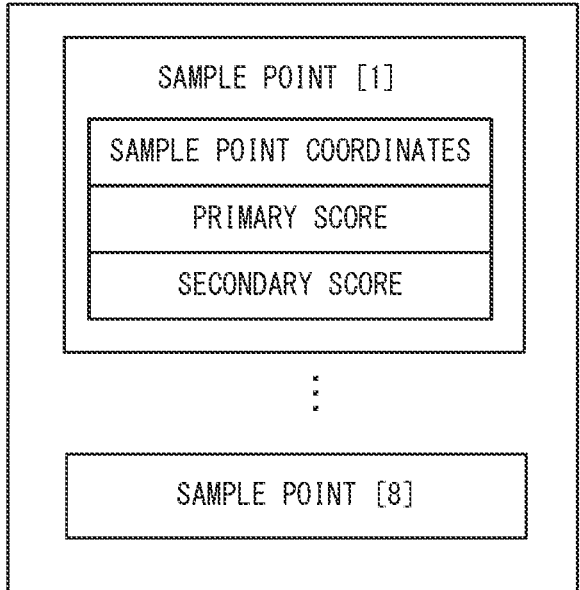

F I G.  2 1
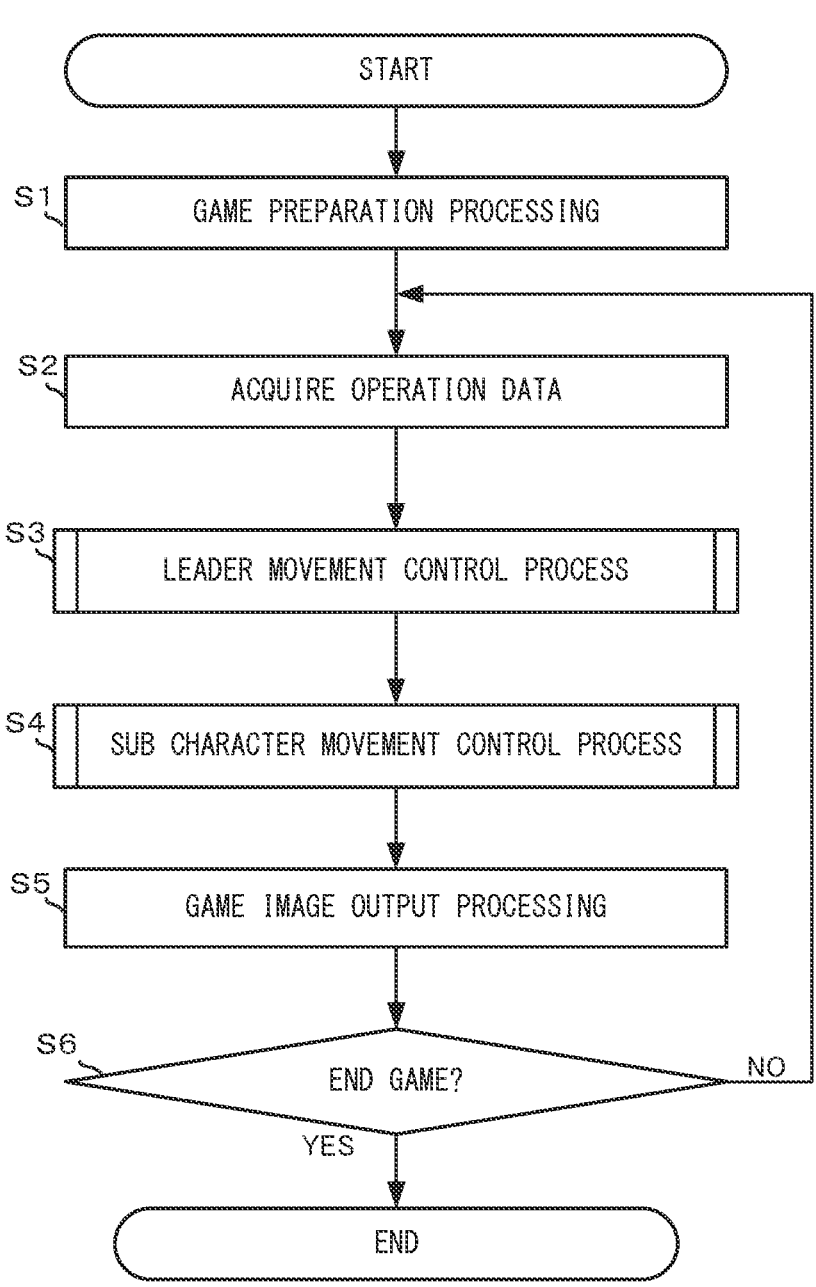

F I G.  2 2
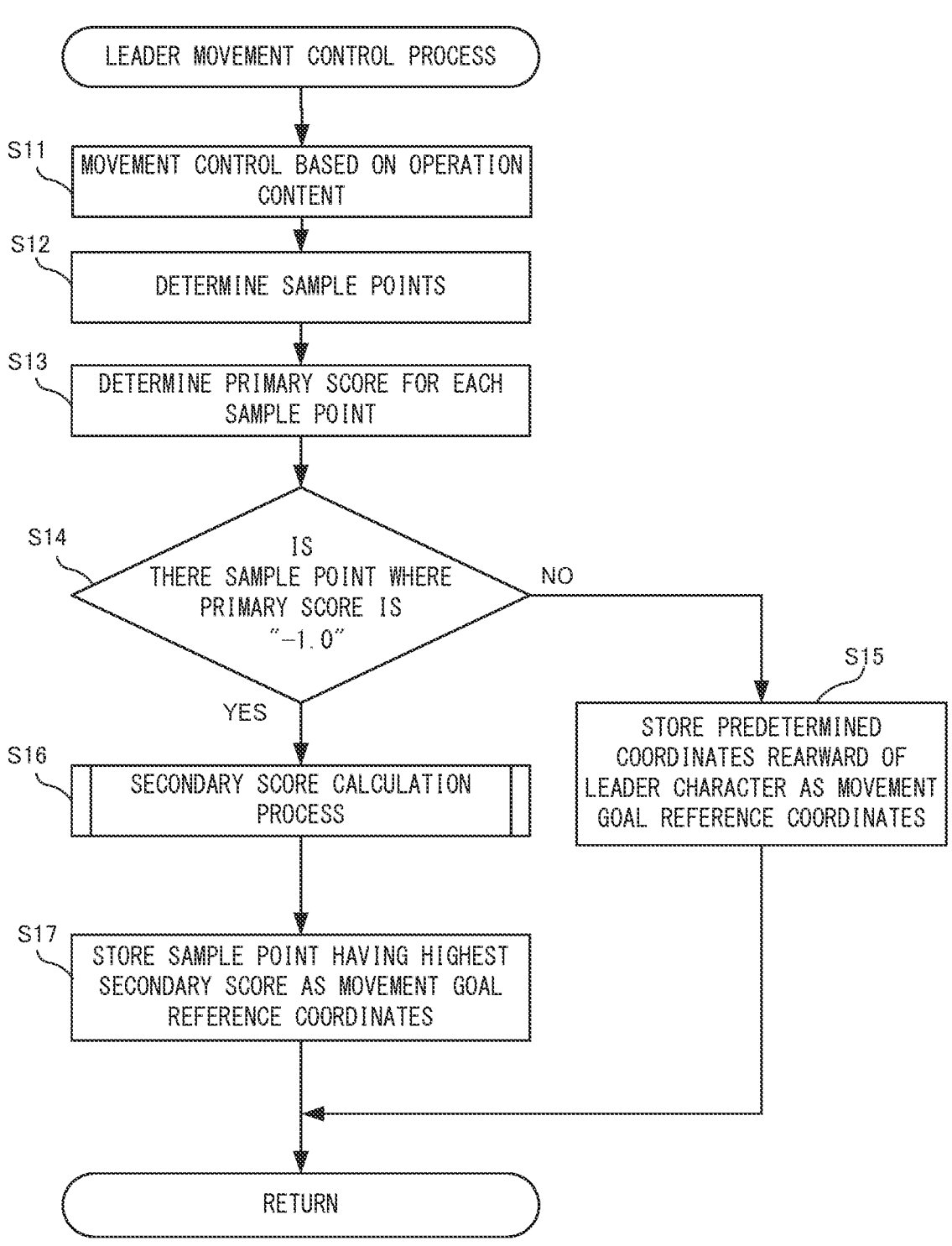

F I G.  2 3
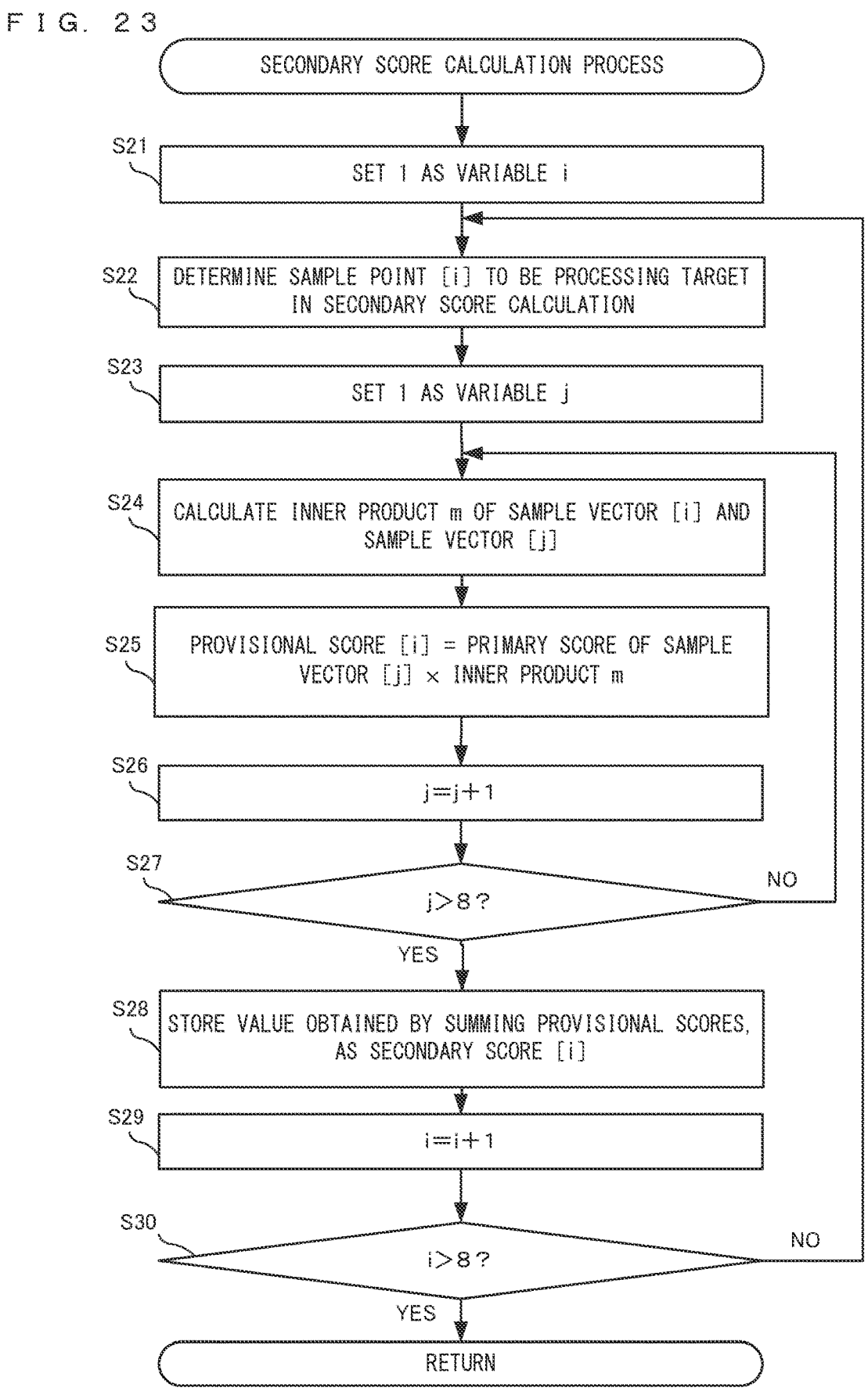

F I G. 2 4
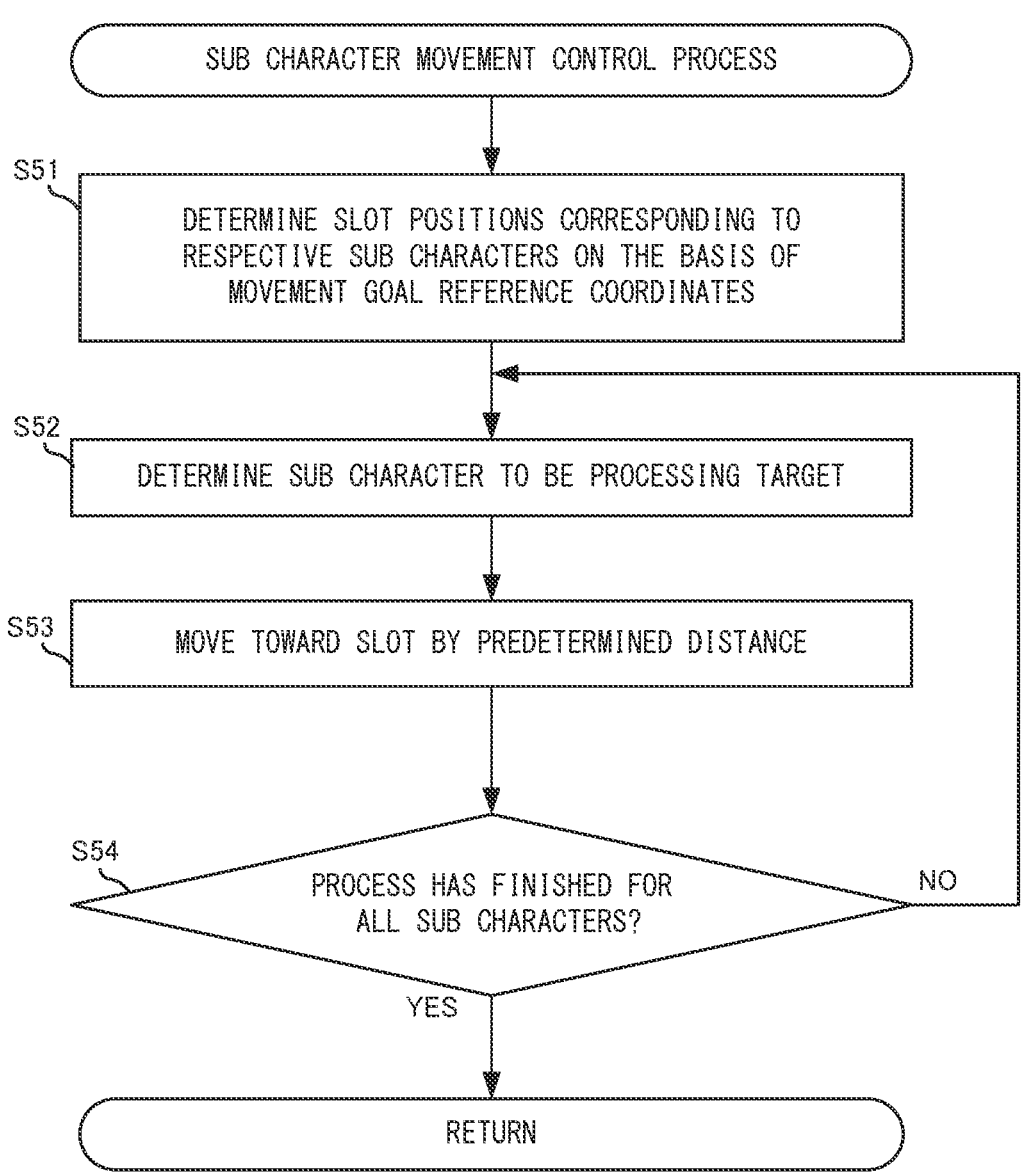

1

COMPUTER-READABLE NON-TRANSITORY STORAGE MEDIUM HAVING INFORMATION PROCESSING PROGRAM STORED THEREIN, INFORMATION PROCESSING SYSTEM, AND INFORMATION PROCESSING METHOD

CROSS REFERENCE TO RELATED APPLICATION

This application claims priority to Japanese Patent Application No. 2022-160691 filed on Oct. 5, 2022, the entire contents of which are incorporated herein by reference.

FIELD

The present disclosure relates to information processing in which an operation target object moves in a virtual space and at least one follow-up object follows the operation target object.

BACKGROUND AND SUMMARY

Conventionally, there has been known a game in which a player character is followed by another follow-up character. In such a game, in order to prevent a follow-up character from being damaged at a movement destination thereof or falling from a cliff, there has also been known a method in which positions through which the player character has moved are recorded as footprints and a range where the follow-up character can move is searched for on the basis of the footprint.

In the above method, the follow-up character is subjected to movement control within a safety area generated on the basis of a plurality of movement-possible ranges that have been found. However, the movement-possible ranges are calculated and stored for each footprint of the player character, and therefore there is room for improvement in terms of reduction of the processing load.

Accordingly, an object of the present disclosure is to provide a computer-readable non-transitory storage medium having an information processing program stored therein, an information processing system, and an information processing method that, in information processing of performing movement control of a predetermined character so as to follow an operation target character, can perform the movement control while preventing the follow-up character from getting into a disadvantageous situation such as falling in a game space, with a reduced processing load.

Configuration examples for achieving the above object will be shown below.

(Configuration 1)

A configuration 1 is a computer-readable non-transitory storage medium having stored therein an information processing program for causing a computer of an information processing apparatus to execute information processing in which an operation target object moves in a virtual space and at least one follow-up object moves while following movement of the operation target object, the program causing the computer to: perform movement control of the operation target object in the virtual space on the basis of an operation input; calculate a plurality of second coordinate sets in the virtual space on the basis of a first coordinate set to which the operation target object is moved; for each of the calculated plurality of second coordinate sets, calculate a movement allowance degree indicating whether or not movement of the follow-up object to the second coordinate set is allowed; on the basis of the calculated movement allowance degrees of the plurality of the second coordinate sets, calculate a movement goal reference coordinate set which is a coordinate set serving as a reference for movement goal determination in moving the follow-up object toward a movement allowed position; and perform movement control of the follow-up object toward a position based on the movement goal reference coordinate set.

According to the above configuration, in performing movement control of the follow-up object, movement allowance degrees around the operation target object are figured out, and the follow-up object is controlled to move in a direction and to a position away from a place where the movement allowance degree is low. Thus, it is possible to prevent occurrence of a disadvantageous situation for the user, in which, for example, the follow-up object falls from a cliff while the follow-up object is moving so as to follow the operation target object.

(Configuration 2)

In a configuration 2 based on the above configuration 1, the information processing program may cause the computer to execute information processing in which two or more said follow-up objects move in accordance with movement of the operation target object. Then, movement goal coordinate sets which are coordinate sets to which the two or more follow-up objects respectively move may be calculated on the basis of the movement goal reference coordinate set, and the follow-up objects may be moved to the respective movement goal coordinate sets.

According to the above configuration, in a case of performing movement control of multiple follow-up objects, the movement allowance degrees can be calculated for these follow-up objects collectively, whereby the processing load can be reduced.

(Configuration 3)

In a configuration 3 based on the above configuration 1 or 2, the movement allowance degrees may be calculated for the respective second coordinate sets present in respective directions at predetermined angles around the first coordinate set.

According to the above configuration, a "direction" in which the movement allowance degree is high is selected, and the movement direction of the follow-up objects is determined using the direction as a reference. Thus, for multiple follow-up objects, a safer movement destination can be efficiently calculated.

(Configuration 4)

In a configuration 4 based on the above configuration 1 or 2, on the basis of, regarding one second coordinate set selected from the plurality of second coordinate sets, information about whether or not movement of the follow-up object is allowed at the selected second coordinate set and information about whether or not movement of the follow-up object is allowed at another second coordinate set present in a vicinity of the selected second coordinate set, the movement allowance degree for each second coordinate set may be calculated.

According to the above configuration, safeties at not only one second coordinate but also another second coordinate present in the vicinity thereof are considered in calculating the movement allowance degree for the one second coordinate, whereby the movement allowance degree can be calculated with higher accuracy.

(Configuration 5)

In a configuration 5 based on the above configuration 4, the information about whether or not movement of the follow-up object is allowed may be represented by either of two values.

According to the above configuration, information about whether or not movement of the follow-up object is allowed is represented by either of two values, whereby it is possible to simplify the data structure without having information on movement allowance degrees set at multiple levels as data of terrain objects, for example.

According to the exemplary embodiment, a disadvantageous situation in which, for example, a follow-up character falls from a cliff, can be prevented from occurring against the user's intention.

BRIEF DESCRIPTION OF THE DRAWINGS

FIG. 1 shows a non-limiting example of a state in which a left controller 3 and a right controller 4 are attached to a main body apparatus 2;

FIG. 2 shows a non-limiting example of a state in which the left controller 3 and the right controller 4 are detached from the main body apparatus 2;

FIG. 3 is six orthogonal views showing a non-limiting example of the main body apparatus 2;

FIG. 5 is six orthogonal views showing a non-limiting example of the right controller 4;

FIG. 6 is a block diagram showing a non-limiting example of the internal configuration of the main body apparatus 2;

FIG. 7 is a block diagram showing a non-limiting example of the internal configurations of the main body apparatus 2, the left controller 3, and the right controller 4;

FIG. 8 is a schematic view showing a non-limiting example of a troop in the exemplary embodiment;

FIG. 9 is a schematic view showing a non-limiting example of a troop in the exemplary embodiment;

FIG. 10 illustrates a non-limiting example of the relationship between movement goal reference coordinates and slots;

FIG. 11 illustrates a non-limiting example of the relationship between slots and sub characters;

FIG. 12 shows a non-limiting example of movement of a troop;

FIG. 13 shows a non-limiting example of movement of a troop;

FIG. 14 shows a non-limiting example of movement of a troop;

FIG. 15 shows a non-limiting example of a case where sub characters fall from a cliff;

FIG. 16 shows a non-limiting example of movement of a troop;

FIG. 17 illustrates a non-limiting example of sample points;

FIG. 18 illustrates a non-limiting example of secondary score calculation;

FIG. 19 is a memory map showing a non-limiting example of various data stored in a DRAM 85;

FIG. 20 shows a non-limiting example of the data structure of sample point data;

FIG. 21 is a flowchart showing a non-limiting example of the details of game processing according to the exemplary embodiment;

FIG. 22 is a flowchart showing a non-limiting example of the details of a leader movement control process;

FIG. 23 is a flowchart showing a non-limiting example of the details of a secondary score calculation process; and FIG. 24 is a flowchart showing a non-limiting example of the details of a sub character movement control process.

DETAILED DESCRIPTION OF NON-LIMITING EXAMPLE EMBODIMENTS

Figure 4:
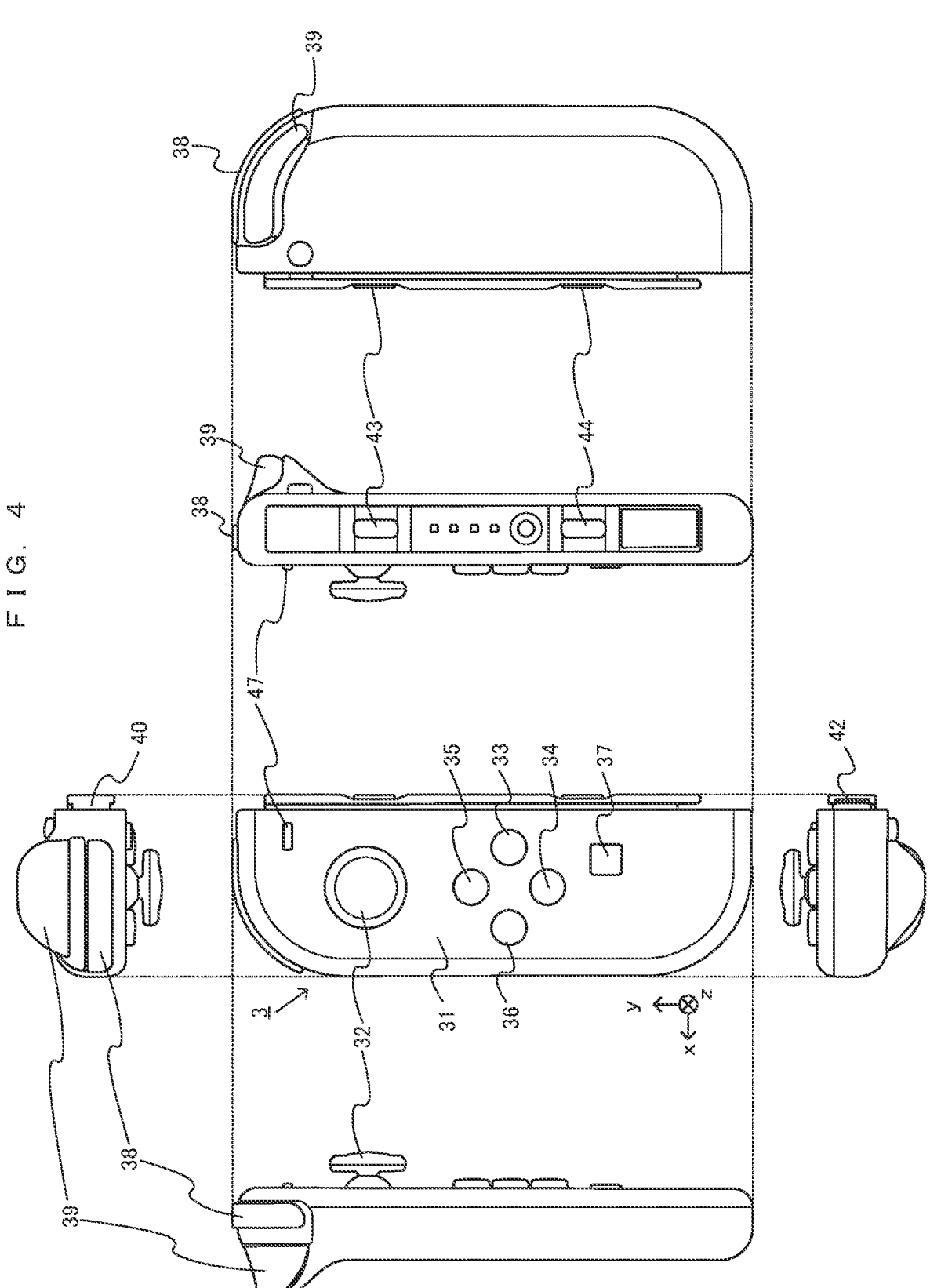
FIG. 4 is six orthogonal views showing a non-limiting example of the left controller 3.

Hereinafter, one exemplary embodiment will be described.

First, a game system according to an example of the exemplary embodiment will be described. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as "controller".

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11a and 11b are formed in the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "—" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). The wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 7:
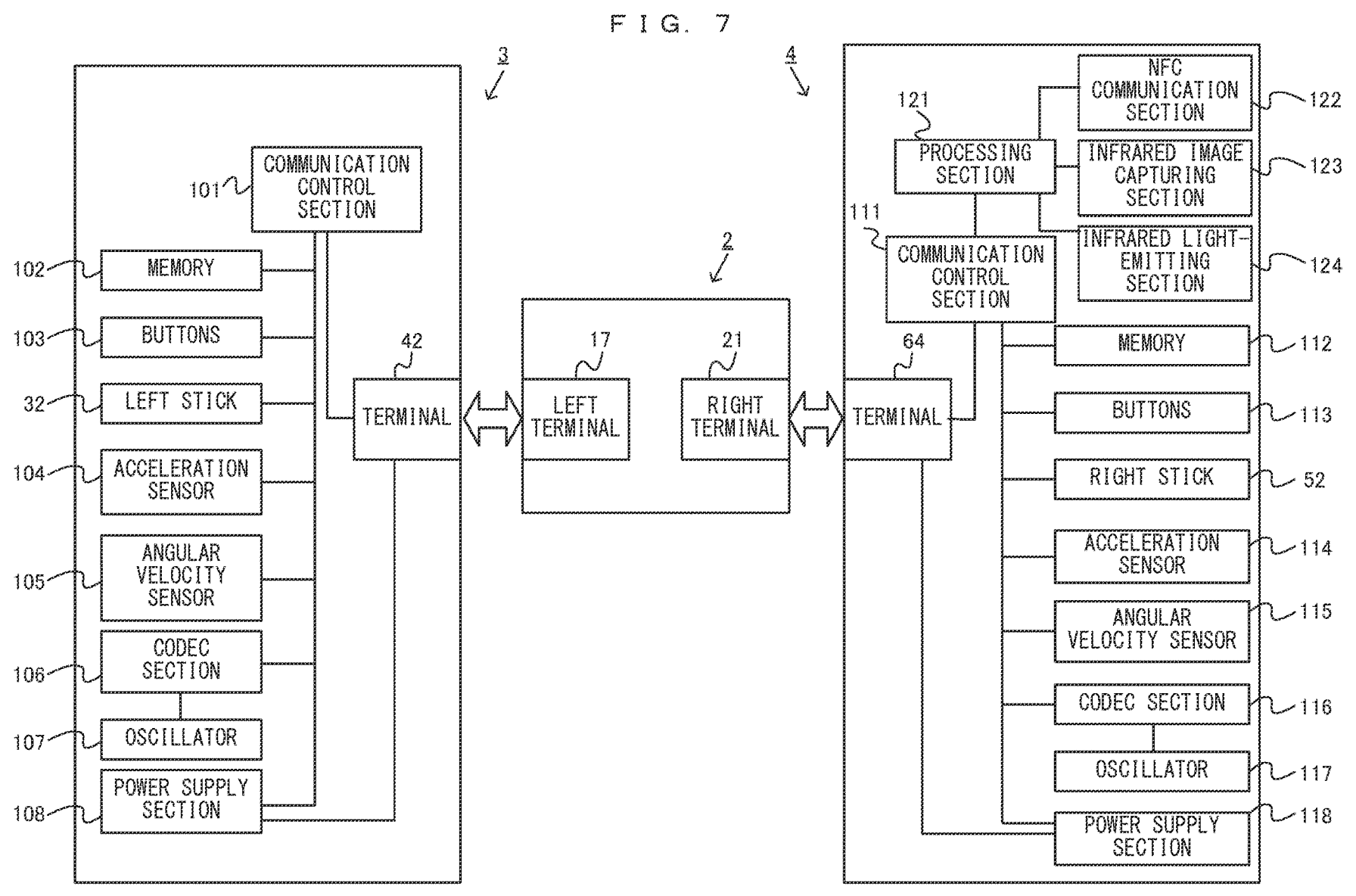

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Outline of Game Processing in Exemplary Embodiment]

Next, the outline of operation in game processing executed in the game system 1 according to the exemplary embodiment will be described. In a game executed in the exemplary embodiment, the user plays by moving a character in a virtual game space using the above controller. In the game space, not only a character (hereinafter, referred to as a leader character) that the user operates but also a plurality of characters (hereinafter, referred to as sub characters) subjected to movement control on the basis of a predetermined algorithm by the processor 81 are present. The plurality of sub characters are subjected to movement control so as to follow the leader character while forming a predetermined troop.

FIG. 8 shows a scene in which the leader character and a plurality of sub characters following the leader character move while forming a troop. However, in actuality, the characters do not move while forming such a well-arranged troop as shown in FIG. 8, and as each sub character is subjected to movement control individually, the troop can have a form as shown in FIG. 9 due to differences in movement speeds of the sub characters, the effects of terrains, and the like. When a sufficient time has elapsed since the leader character stopped movement, the sub characters basically come to stop at positions as shown in FIG. 8.

[Movements of Sub Characters]

Next, movement control of the above sub characters will be described. In the exemplary embodiment, the sub characters move while heading toward the positions of "slots" determined on the basis of "movement goal reference coordinates". In the exemplary embodiment, a plurality of movement goal points are set as the slots, in the game space. Then, one slot is associated with each sub character, and each sub character is moved toward the corresponding slot. Here, the movement goal reference coordinates are coordinates serving as a reference for determining the position of the slot of each sub character. In other words, the movement goal reference coordinates are coordinates serving as a "representative point" of a movement destination of the entire troop of the sub characters. In the exemplary embodiment, basically, the movement goal reference coordinates are located on a side opposite to the orientation (advancement direction) of the leader character, as shown in FIG. 10. Then, the slots are arranged at predetermined positions in the vicinity of the movement goal reference coordinates. As a result, the slots are arranged on the side opposite to the orientation (advancement direction) of the leader character. However, as described later, under a predetermined condition, the movement goal reference coordinates may be located at a position that is not on the side opposite to the orientation of the leader character, and as a result, the slots may also be arranged at positions that are not on the side opposite to the orientation of the leader character.

Next, the relationship between the slots and the sub characters will be described. Each sub character is associated with a slot number serving as a movement goal point, individually. For example, a sub character number 1 is associated with a slot number 1, a sub character number 2 is associated with a slot number 2, and a sub character number 3 is associated with a slot number 3. As a result, as shown in FIG. 11, a sub character (hereinafter, simply referred to as a sub character 1) whose sub character number is 1 moves while heading toward the slot 1, the sub character 2 moves while heading toward the slot 2, and the sub character 3 moves while heading toward the slot 3. In the example in FIG. 11, the character numbers are equal to the slot numbers, but this is merely an example and the corresponding relationship may be arbitrarily set.

As described above, each sub character moves while heading toward the slot associated with itself, whereby the sub characters move in the game space while forming a predetermined troop and following the leader character.

Here it is assumed that, in the game space, there is a terrain from which the sub character (also the leader character) can fall when going there. Such terrains are, for example, a "cliff" (can fall down the cliff) and a water surface (sink into the water). In the exemplary embodiment, a case where there is a cliff as such a dangerous terrain will be described as an example.

As shown in FIG. 12, it is assumed that the leader character present on a cliff top and the sub characters are moving close to the edge of the cliff (the advancement direction is an upward direction in FIG. 12). In this case, the movement goal reference coordinates are set at a predetermined position rearward of the leader character, and on the basis of the movement goal reference coordinates, the slots of the sub characters are arranged on a side opposite to the orientation of the leader character. In FIG. 12, the slots of the sub characters are approximately included within an area 101, as an example. As a result, a troop of the sub characters is formed at the rear of the leader character and moves while following the leader character.

Thereafter, as shown in FIG. 13, the leader character moves to a position just near the edge of the cliff. Then, as shown in FIG. 14, the leader character turns its orientation rightward by 90 degrees and moves along the edge of the cliff (in a rightward direction in FIG. 14). In this case, if the slots are arranged so as to form a troop rearward of the leader character as described above and movement control of the sub characters is performed, as shown in FIG. 15, some of the sub characters can fall from the cliff. If the sub characters fall as described above, for example, the sub characters go off the troop or the sub characters disappear, thus causing a disadvantage to the user. Therefore, it is desirable to prevent such fall.

Here, as a method for preventing the fall described above, for example, a method of setting an invisible wall (collision) at the edge part of the cliff is conceivable. However, in this method, both the leader character and the sub characters cannot advance ahead of edges of cliffs present in the game all together. Therefore, it is impossible to cope with such a case of desiring to intentionally fall the leader character from a cliff in game progress. In addition, in the above method, there is no risk of falling from a cliff in the first place. Therefore, it is impossible to provide the way of enjoying an operation (game nature) as in a case where the user performs a fine operation so that the leader character does not fall from a cliff, for example.

Accordingly, in the exemplary embodiment, in order to prevent (unintentional) fall of the sub character, a safety degree around the leader character (in other words, an allowance degree for the sub character to move to the position) is determined. Then, control is performed so that the sub character (troop) moves toward a position away from a position where the safety degree is low (a position to which the user does not desire to move the sub characters). For example, as shown in FIG. 16, movement control is performed so that a troop is formed on the right side as seen from the leader character (downward in FIG. 16) instead of a position on a side opposite to the orientation of the leader character (rearward of the leader character). The right side is a side opposite to the side where there is a cliff, as seen from the leader character. A position on such a side is considered to be high in safety (low in the possibility of falling). Therefore, the movement goal reference coordinates are set at a predetermined position on the right side, and on the basis of this position, the positions of the slots are set. As a result, the slots are arranged approximately in a range indicated by an area 101 in FIG. 16, and the sub characters (the entire troop) move toward positions away from the cliff. Then, in a case where the leader character moves rightward in FIG. 16 from the state in FIG. 16, the position of the movement goal reference coordinates and the positions of the slots based thereon also change so as to move rightward in FIG. 16. As a result, the sub characters (troop) make motions so as to move rightward in parallel to the leader character. In FIG. 16, the orientation of the area 101 remains as it is even after the movement goal reference coordinates are set again, but when the movement goal reference coordinates are set again, the orientation of the area 101 may be controlled to turn toward the player character (the area 101 may be turned into an oblique shape).

Next, in the exemplary embodiment, the outline of the control as described above (a method for calculating safety in a surrounding area) will be described. In the exemplary embodiment, first, as shown in FIG. 17, a plurality of coordinate sets around the leader character are acquired. Hereinafter, the acquired coordinate sets are referred to as sample points. In this example, the number of the sample points is assumed to be 8. In another exemplary embodiment, the number of the sample points may be larger or smaller than 8. Hereinafter, a direction vector from the position (present coordinates) of the leader character to each sample point is referred to as a sample vector. In this example, the angles between the sample points are assumed to be the same angle. For example, in FIG. 17, eight sample points A to H are arranged at intervals of 45 degrees (equal intervals) on a circumference about the position (foot position) of the leader character in a two-dimensional coordinate system (xz plane in FIG. 17) when the virtual space is seen from above.

After the sample points as described above are determined, next, a primary score is calculated as primary information indicating the safety degree of each sample point. In this example, the primary score is calculated as follows. First, in the virtual space, from coordinates located away directly upward (in a y-axis position direction) from the sample point by a first distance, a line (ray) is cast directly downward (in a y-axis negative direction) by a second distance (e.g., the same distance as the first distance). Then, the primary score is calculated on the basis of whether or not the line hits on something. Further, if the line hits, the primary score is calculated on the basis of the attribute of an object (terrain) at the hit location. The attribute is information set in advance on a terrain object, and is, for example, information such as "ground" or "water surface". In the exemplary embodiment, if the line cast by the second distance hits on nothing, the sample point is a position ahead of the cliff (i.e., in a space and at coordinates where there is no terrain and anything falls) and thus is determined to be a "dangerous" sample point. In a case where the line hits and the attribute of the hit (terrain) object is a "water surface", the sample point is determined to be "dangerous". If the line hits on something other than a "water surface", the sample point is determined to be "safe". Then, the primary score is set at "0" in a case of "safe", and "−1.0" in a case of "dangerous". That is, in the exemplary embodiment, the primary score is calculated as either of two values, i.e., "safe (0)" or "dangerous (−1.0)". In the above example, it has been described that the second distance is the same distance as the first distance. However, for example, the second distance may be set at a value greater than the first distance by a predetermined amount, so that a step whose level difference is not greater than a certain value is not considered to be a cliff and is not determined to be dangerous.

Next, one sample point determined to be safe is selected from the sample points and is set as the movement goal reference coordinates. Here, in a case where sample points are determined when the leader character is present near the edge of the cliff as shown in FIG. 13, for example, a result as shown in FIG. 18 is obtained. Then, in FIG. 18, the sample points determined to be safe by the primary scores (two-value determination) are sample points C to G. Here, in the situation in FIG. 18, the sample point E located farther from the cliff than the sample point C and the sample point G located closer to the cliff is considered to be higher in the safety degree. Accordingly, in the exemplary embodiment, secondary scores are calculated in order to select a sample point having a higher safety degree among the sample points determined to be safe by the two-value determination. In the exemplary embodiment, calculation is performed again with the primary score of each sample point weighted, whereby the secondary score for each sample point is calculated. Then, the sample point having the highest secondary score is set as the movement goal reference coordinates. In the exemplary embodiment, the secondary score is calculated by the following Expression (1).

[Mathematical 1]

$$\text{Secondary score } [i] = \Sigma \text{ primary score } [j] \times (Sv[i] \cdot Sv[j]) \tag{1}$$

where variables i and j are numbers of elements in a sequence when the sample points and the sample vectors are regarded as the sequence.

For example, in a case of calculating the secondary score for the sample point A, an inner product of the sample vector A and each of the sample vectors A to H is calculated and values obtained by multiplying the primary score for the sample point A by each of the inner products are summed That is, in calculation of the secondary score for the sample point A, the primary scores for the points (sample points B, H) located on the same side as the sample point A as seen from the player character are added as values weighted in accordance with closeness to the sample point A, and the primary scores for the points (sample points D, E, F) located on the side opposite to the sample point A as seen from the player character are added in a sign-inverted state as values weighted in accordance with closeness to the sample point A. Regarding the sample points C, G, inner products of the sample vector A and the sample vectors C, G are zero, and therefore they do not influence calculation of the secondary score for the sample point A. Regarding the secondary score calculated as described above, the higher (safer) the primary score for a point located on the same side as the sample point A as seen from the player character is, the higher the secondary score is, and the lower (more dangerous) the primary score for a point located on the side opposite to the sample point A as seen from the player character is, the higher the secondary score is. Therefore, regarding the sample point having the highest secondary score, points on the same side are likely to be safe and points on the opposite side are likely to be dangerous, so that the sample point having the highest secondary score is considered to be a sample point having the highest safety degree and thus is set as the movement goal reference coordinates.

As described above, in the exemplary embodiment, safety degrees at positions (space) around the leader character are calculated, and among directions toward positions other than a position considered dangerous, a direction that is higher in safety is selected and a troop of the sub characters is moved in that direction. Thus, when the sub characters are moved while following the leader characters, (some) sub characters can be prevented from falling at a terrain such as a cliff.

[Details of Game Processing in Exemplary Embodiment]

Next, with reference to FIG. 19 to FIG. 24, the game processing in the exemplary embodiment will be described in more detail. Here, mainly, processing relevant to movement control of a troop of sub characters considering the safety degrees as described above will be described and the detailed description of other kinds of game processing is omitted.

[Used Data]

First, various data used in this game processing will be described. FIG. 19 is a memory map showing an example of various data stored in the DRAM 85 of the main body apparatus 2. The DRAM 85 of the main body apparatus 2 stores at least a game program 301, leader character data 302, sub character data 303, slot management data 304, slot association data 305, terrain data 306, sample point data 307, and operation data 308.

The game program 301 is a program for executing the game processing in the exemplary embodiment.

The leader character data 302 is data about the leader character. The leader character data 302 includes leader coordinates indicating the coordinates of the present position of the leader character, an orientation vector of the leader character, and the movement goal reference coordinates as described above.

The sub character data 303 is data about the sub character. In the sub character data 303, sub character coordinates are stored for each sub character. The sub character coordinates are the coordinates of the present position of the sub character.

The slot management data 304 is data for managing the slots described above. In the slot management data 304, slot coordinates are stored for each slot.

The slot association data 305 is data defining the correspondence relationship between slots and sub characters.

The terrain data 306 is data of various terrain objects to be placed in the virtual space. Data of each terrain object includes mesh model data and data indicating a placement position. In addition, the data of each terrain object includes information indicating the attribute of the terrain as described above.

In the sample point data 307, sample points as shown in FIG. 17 are (temporarily) stored. FIG. 20 shows an example of the data structure of the sample point data 307. In the sample point data 307, data of a plurality of (in this example, eight) sample points are stored. The data of each sample point includes sample point coordinates, the primary score, and the secondary score. The sample point coordinates are the coordinates of the sample point in the virtual space coordinate system. The primary score and the secondary score are stored values of the above-described primary score and secondary score.

Returning to FIG. 19, the operation data 308 is data obtained from the controller operated by the user. That is, the operation data 308 is data indicating the content of operation performed by the user.

[Details of Processing Executed by Processor 81]

Next, the details of the game processing in the exemplary embodiment will be described. In the exemplary embodiment, one or more processors read and execute the program stored in one or more memories, to implement flowcharts shown below. The flowcharts are merely an example of a processing procedure. Therefore, the processing order of steps may be changed as long as the same result is obtained. In addition, values of variables and thresholds used in determination steps are merely examples, and other values may be used as necessary.

FIG. 21 is a flowchart showing the details of the game processing in the exemplary embodiment. A processing loop from step S2 to step S6 in FIG. 21 is repeatedly executed every frame.

[Preparation Processing]

First, in step S1, the processor 81 executes game preparation processing for preparation for starting the game. In this processing, a virtual three-dimensional space including a game field is created and various objects such as a terrain object, a leader character, and a sub character are placed. Then, the virtual space in which the various objects are placed is captured by a virtual camera, to generate a game image, and the image is outputted to a stationary monitor or the like. In addition, various data to be used in the subsequent processing are initialized.

[Movement Control Process for Leader Character]

Next, in step S2, the processor 81 acquires the operation data 308. Next, in step S3, the processor 81 executes a leader movement control process. FIG. 22 is a flowchart showing the details of the leader movement control process. In FIG. 22, first, in step S11, the processor 81 updates the leader coordinates and the orientation vector on the basis of the operation content indicated by the operation data 308, thus performing movement control of the leader character.

Next, in step S12, the processor 81 determines sample points and stores them in the sample point data 307. In this example, coordinates obtained at intervals of 45 degrees on a circumference with a predetermined radius about the leader character as shown in FIG. 17 are determined as sample points. Then, the determined coordinates are stored as the sample point coordinates of the sample points. Here, eight sample points as shown in FIG. 17 are stored in the sample point data 307 (sample point [1] to sample point [8]) in the order from the sample point A to the sample point H described above.

Next, in step S13, the processor 81 calculates the primary scores for the sample points by the above-described method and stores them as the primary scores in the sample point data 307. That is, the processor 81 casts a line directly downward from a position directly above each sample point. Then, if the line hits on nothing or hits on a "water surface", the processor 81 sets "−1.0" as the primary score for the sample point, and otherwise, sets "0".

Next, in step S14, the processor 81 determines whether or not there is a sample point whose primary score is "−1.0" in the sample point data 307. As a result of the determination, if there is no such sample point (NO in step S14), in step S15, the processor 81 sets the movement goal reference coordinates at predetermined coordinates on a (rearward) side opposite to the orientation (advancement direction) of the leader character, on the basis of the position and the orientation of the leader character. The predetermined coordinates are at a position away in the direction opposite to the orientation of the leader character by a relative distance defined in advance, for example. Then, the processor 81 ends the leader movement control process.

On the other hand, as a result of the determination in step S14, if there is at least one sample point whose primary score is "−1.0" (YES in step S14), in step S16, the processor 81 executes a secondary score calculation process. FIG. 23 is a flowchart showing the details of the secondary score calculation process. In FIG. 23, first, in step S21, the processor 81 sets 1 as the variable i.

Next, in step S22, the processor 81 selects one sample point [i] as a target of the following calculation processing (hereinafter, referred to as a processing target sample point), from the eight sample points. In the subsequent step S23, the processor 81 sets 1 as the variable j.

Next, in step S24, the processor 81 calculates an inner product m of a sample vector [i] and a sample vector [j]. The sample vector [i] is a vector from the leader coordinates to the processing target sample point. The sample vector [j] is a vector from the leader coordinates to the sample point at the order position indicated by the variable j in the sample point data 307.

Next, in step S25, the processor 81 calculates a value obtained by multiplying the primary score of the sample vector [j] by the inner product m, as a provisional score [i].

Next, in step S26, the processor 81 adds 1 to the variable j. In the subsequent step S27, the processor 81 determines whether or not the variable j is greater than 8, and if the variable j is equal to or smaller than 8 (NO in step S27), the processor 81 returns to step S24, to repeat the process.

On the other hand, if the variable j is equal to or greater than 9 (YES in step S27), in step S28, the processor 81 calculates a value obtained by summing the provisional scores calculated in step S25. Then, the processor 81 stores the calculated sum value as the secondary score [i] for the processing target sample point in the sample point data 307.

Next, in step S29, the processor 81 adds 1 to the variable i. In the subsequent step S30, the processor 81 determines whether or not the variable i is greater than 8. Then, if the variable i is equal to or smaller than 8 (NO in step S30), the processor 81 returns to step S22, to repeat the process. If the variable i is equal to or greater than 9 (YES in step S30), the processor 81 ends the secondary score calculation process.

Returning to FIG. 22, next, in step S17, the processor 81 stores the sample point having the highest secondary score among the secondary scores calculated for the sample points, as the movement goal reference coordinates. Then, the processor 81 ends the leader movement control process.

[Movement Control Process for Sub Character]

Returning to FIG. 21, after the leader movement control process is finished, next, in step S4, the processor 81 executes a sub character movement control process. FIG. 24 is a flowchart showing the details of the sub character movement control process. In FIG. 24, first, in step S51, the processor 81 determines the positions of slots to be associated with the respective sub characters, on the basis of the movement goal reference coordinates, and stores them in the slot management data 304. For example, for the positions of the slots, relative coordinates with respect to the movement goal reference coordinates may be defined in advance, and the positions of the slots may be determined in accordance with the relative coordinates.

Next, in step S52, the processor 81 determines one sub character (hereinafter, referred to as a processing target character) to be a processing target. In other words, processing in steps S53 to S54 described below is repeated the same number of times as the number of sub characters.

Next, in step S53, the processor 81 changes the orientation (direction) of the sub character to the direction toward the slot associated with the processing target character, as necessary. Then, the processor 81 moves the processing target character in the direction toward the slot by a predetermined distance.

Next, in step S54, the processor 81 determines whether or not movements of all the sub characters toward their respective slots have finished. As a result, if there is a sub character not having undergone the process (NO in step S54), the process returns to step S52, to determine the next processing target character from the sub characters not having undergone the process, and the same process is repeated. On the other hand, if the process has finished for all the sub characters (YES in step S54), the sub character movement control process is ended.

[Game Image Output Process]

Returning to FIG. 21, when the sub character movement control process has finished, next, in step S5, the processor 81 generates a game image with the above processing reflected therein, and outputs the game image.

Next, in step S6, the processor 81 determines whether or not a game ending condition is satisfied. If the game ending condition is not satisfied (NO in step S6), the process returns to step S2, so as to be repeated. If the game ending condition is satisfied (YES in step S6), the game processing is ended.

Thus, the detailed description of the game processing according to the exemplary embodiment has finished.

As described above, in the exemplary embodiment, in a case of moving the sub character so as to follow the leader character, the safety degrees around the leader character are figured out and a troop of the sub characters is controlled to move in a direction away from a place where the safety degree is low. Thus, it is possible to prevent occurrence of a disadvantageous situation for the user, in which, for example, a sub character falls from a cliff, during follow-up movement.

In addition, by the processing using the movement goal reference coordinates as described above, the safety degree at a movement destination is calculated for a plurality of sub characters collectively. Thus, the processing load can be reduced as compared to a case of calculating the safety degree at a movement destination for each sub character.

Modifications

In the exemplary embodiment, a cliff and a water surface have been shown as examples of "dangerous terrains". Other than these, a terrain such as a so-called "damage floor" from which a character is damaged when entering there may be used as a dangerous terrain.

In the above exemplary embodiment, the slot positions of all the sub characters are determined on the basis of the same movement goal reference coordinates. For example, in order to avoid a risk of falling from a cliff as shown above, the entire troop of the sub characters is controlled to move toward the movement goal reference coordinates (the vicinity thereof) located farther from the cliff. In this regard, in another exemplary embodiment, only some of the sub characters may be controlled so as to change their movement directions, instead of uniformly applying the control to all the sub characters. For example, it is assumed that a plurality of types (attributes) are imparted to sub characters. Specifically, it is assumed that there are a sub character of a first type (first-type sub character) and a sub character of a second type (second-type sub character). Then, it is assumed that the former sinks when entering a terrain "water area" and the latter can move by swimming when entering the "water area" (the water area is not a dangerous terrain for the latter). In the case where there are such two types of sub characters, two troops, i.e., a first-type troop including only the first-type sub characters and a second-type troop including only the second-type sub characters, are formed. Then, the movement goal reference coordinates may be determined for each troop (each type). At this time, the primary scores may be calculated for each type of the sub characters. For example, regarding the "water area", the primary score may be calculated as "−1 (dangerous)" for the first-type sub character, and the primary score may be calculated as "0 (safe)" for the second-type sub character. Then, the secondary score and the movement goal reference coordinates may also be calculated for each type of the sub characters. Thus, for example, normally, both troops are controlled so as to move while following the leader character from the rear side. On the other hand, when the leader character comes close to a water area, the slots for the first-type troop are set on the basis of first movement goal reference coordinates set at a position farther from the water area. Then, the slots for the second-type troop are set on the basis of second movement goal reference coordinates set at the rear of the leader character. That is, even when the leader character moves along the water area, the second-type troop may be controlled so as to move while following the leader character from the rear side, as usual.

In the case of using a plurality of types of sub characters as described above, for example, common movement goal reference coordinates may be set with reference to the sub characters that are the type of which the number of sub characters is largest in the troop, instead of setting the movement goal reference coordinates different among the types. For example, in the aforementioned case, it is assumed that there is one troop including two first-type sub characters and ten second-type sub characters. In this case, when the leader character moves along a water area, the safety degree may be determined with reference to the second-type sub characters which are the majority, and as a result, all the twelve sub characters may be controlled to move while following the leader character from the rear side.

In the above exemplary embodiment, from the above-described sample points, one sample point (having the highest secondary score) is selected as the movement goal reference coordinates. In this regard, in another exemplary embodiment, the coordinates of the selected sample point and the movement goal reference coordinates may not necessarily coincide with each other. For example, coordinates slightly offset from the coordinates of the sample point having the highest secondary score may be set as the movement goal reference coordinates, or the secondary score at any point at a predetermined distance from the player character may be calculated from the primary scores of the sample points.

The number of the sample points may be a fixed number or may be changed in accordance with the game condition. Increasing the sample points is advantageous in that the position having a high safety degree can be determined more accurately, and decreasing the sample points is advantageous in that the processing load is reduced.

In the above exemplary embodiment, the positions of the sample points are arranged at equal angles on a circumference of a circle around the present coordinates of the leader character as shown in FIG. 17. In another exemplary embodiment, the distances from the present coordinates of the leader character to the sample points and the angles between the sample points may not necessarily be the same values. Any positions may be used as the sample points as long as they are in a range considered to be around (in the vicinity of) the leader character.

Regarding calculation of safety degrees around the leader character, in another exemplary embodiment, safety degrees may be calculated by a method other than the above-described method. For example, regarding calculation of the primary score, a terrain object itself may be imparted with information indicating a safety degree. Then, the sample points are determined as described above, and the safety degree for each sample point may be calculated on the basis of whether or not a terrain object is present at each sample point (whether or not the terrain object is a cliff) and on the basis of, if such a terrain object is present, information indicating the safety degree that the terrain object has. In the above exemplary embodiment, as a value indicating the allowance degree for the sub character to move to a given position, the safety degree (the score increases as the position becomes safer) for the position is determined. Alternatively, as a value indicating the allowance degree for movement, a danger degree (the score increases as the position becomes more dangerous) may be used and the sub characters may be moved to a side with a lower danger degree.

Regarding the secondary score, in the above exemplary embodiment, all the sample points are considered in calculation for the secondary score. Alternatively, for example, only sample points adjacent to both sides of a given sample point may be considered and a weighted average of these sample points may be calculated as the secondary score. In this case, determination accuracy for the safety degree might be reduced as compared to the above-described method, but the processing load can be reduced. Accordingly, the determination accuracy may be adjusted depending on the scene, and thus movement control (game balance) may be intentionally configured such that "sub characters move while avoiding danger to a certain extent but there is still a possibility of falling", so as to provide a feeling of tension to the user in operation of the leader character.

In the above exemplary embodiment, the case where the sequential processing in the game processing is executed by a single main body apparatus 2 has been described. In another exemplary embodiment, the sequential processing may be executed in an information processing system including a plurality of information processing apparatuses. For example, in an information processing system including a terminal-side apparatus and a server-side apparatus that can communicate with the terminal-side apparatus via a network, a part of the sequential processing may be executed by the server-side apparatus. In an information processing system including a terminal-side apparatus and a server-side apparatus that can communicate with the terminal-side apparatus via a network, a major part of the sequential processing may be executed by the server-side apparatus and a part of the sequential processing may be executed by the terminal-side apparatus. In the information processing system, a server-side system may include a plurality of information processing apparatuses and processing to be executed on the server side may be executed by the plurality of information processing apparatuses in a shared manner. A configuration of so-called cloud gaming may be adopted. For example, the main body apparatus 2 may transmit operation data indicating a user's operation to a predetermined server, various game processing may be executed on the server, and the execution result may be distributed as a video and a sound by streaming to the main body apparatus 2.

While the present disclosure has been described herein, it is to be understood that the above description is, in all aspects, merely an illustrative example, and is not intended to limit the scope thereof. It is to be understood that various modifications and variations can be made without deviating from the scope of the present disclosure.

What is claimed is:

1. A computer-readable non-transitory storage medium having stored therein an information processing program for causing a computer of an information processing apparatus to execute information processing for moving an operation target object and a plurality of second objects in a virtual space, the information processing program comprising instructions that are configured to cause the computer to:

perform movement control of the operation target object in the virtual space based on an operation input;

calculate a plurality of second coordinate sets in the virtual space based on location of the operation target object within the virtual space;

for each corresponding coordinate set of the calculated plurality of second coordinate sets, calculate a movement allowance degree indicating whether or not movement to the corresponding coordinate set is allowed;

on the basis of the calculated movement allowance degree as of the plurality of the second coordinate sets, calculate a movement goal reference coordinate set which is a coordinate set serving as a reference for movement goal determination in moving the plurality of second objects toward a movement allowed position; and perform movement control for each of the plurality of second objects to follow the operation target object based on the movement goal reference coordinate set.

2. The computer-readable non-transitory storage medium according to claim 1, wherein the movement control for each of the plurality of second objects includes determining, based on the movement goal reference coordinate set, movement goal coordinate sets which are coordinate sets to which the plurality of second objects respectively move are calculated on the basis of the movement goal reference coordinate set, and the plurality of second objects are moved to the respective movement goal coordinate sets.

3. The computer-readable non-transitory storage medium according to claim 2, wherein the movement allowance degree is calculated for the respective second coordinate sets present in respective directions at predetermined angles around a first coordinate set at which the operation target object is located.

4. The computer-readable non-transitory storage medium according to claim 2, wherein the instructions are further configured to:

calculate, for at least one of the plurality of second coordinate sets, the movement allowance degree for the at least one second coordinate set based on information about whether or not movement of a following object is allowed at the at least one second coordinate set and information about whether or not movement of the following object is allowed at another one of the plurality of second coordinate sets that is in a vicinity of the at least one second coordinate set.

5. The computer-readable non-transitory storage medium according to claim 4, wherein the information about whether or not movement of the following object is allowed is represented by either of two values.

6. An information processing system for executing information processing in which an operation target object moves in a virtual space and a plurality of second objects move while following the operation target object, the information processing system comprising a processor and a memory coupled thereto, the processor being configured to control the information processing system to at least execute operations comprising:

performing movement control of the operation target object in the virtual space based on an operation input;

calculating a plurality of second coordinate sets in the virtual space based on location of the operation target object within the virtual space;

for each corresponding coordinate set of the calculated plurality of second coordinate sets, calculating a movement allowance degree indicating whether or not movement to the corresponding coordinate set is allowed;

on the basis of the calculated movement allowance degrees of the plurality of the second coordinate sets, calculating a movement goal reference coordinate set which is a coordinate set serving as a reference for movement goal determination in moving the plurality of second objects toward a movement allowed position; and performing movement control for each of the plurality of second objects to follow the operation target object based on the movement goal reference coordinate set.

7. An information processing method for executing information processing in which an operation target object moves in a virtual space and a plurality of second objects follow the operation target object, the method comprising:

performing movement control of the operation target object in the virtual space based on an operation input;

calculating a plurality of second coordinate sets in the virtual space based on location of the operation target object within the virtual space;

for each corresponding coordinate set of the calculated plurality of second coordinate sets, calculate a movement allowance degree indicating whether or not movement to the corresponding coordinate set is allowed;

on the basis of the calculated movement allowance degrees of the plurality of the second coordinate sets, calculate a movement goal reference coordinate set which is a coordinate set serving as a reference for movement goal determination in moving the plurality of second objects toward a movement allowed position; and performing movement control for each of the plurality of second objects to follow the operation target object based on the movement goal reference coordinate set.

* * * * *